US006938878B2

(12) United States Patent
Tonati

(10) Patent No.: US 6,938,878 B2
(45) Date of Patent: Sep. 6, 2005

(54) DIRECT FLOW TAP FOR DISPENSING DRINKS, PROVIDED WITH IMPROVED DEVICES FOR STOPPING THE OPERATING HANDLE

(75) Inventor: Domenico Tonati, Borgomanero (IT)

(73) Assignee: TOF S.r.l., S. Maurizio D'Opaglio (IT)

( * ) Notice: Subject to any disclaimer, the term of this patent is extended or adjusted under 35 U.S.C. 154(b) by 20 days.

(21) Appl. No.: 10/704,523

(22) Filed: Nov. 6, 2003

(65) Prior Publication Data

US 2004/0183045 A1 Sep. 23, 2004

(30) Foreign Application Priority Data

Nov. 12, 2002 (IT) ..................................... MI2002U0523

(51) Int. Cl.[7] ................................................ F16K 51/00

(52) U.S. Cl. .................... 251/286; 251/284; 251/315.1; 251/315.06; 251/315.16

(58) Field of Search ................................. 251/284, 286, 251/315.01, 287, 315.06, 315.1, 315.16

(56) References Cited

U.S. PATENT DOCUMENTS 1,299,586 A * 4/1919 Liebing ...................... 137/605
1,331,025 A * 2/1920 Riggin ........................ 251/86
5,323,805 A * 6/1994 Scaramucci ................. 137/385
5,507,314 A * 4/1996 Knapp ................... 137/625.41
5,873,389 A * 2/1999 Cheng ........................ 137/801
6,382,590 B1 * 5/2002 Wu ............................ 251/286
6,446,935 B1 * 9/2002 Winkler ................... 251/315.1
6,629,683 B2 * 10/2003 Wang ...................... 251/315.1

* cited by examiner

*Primary Examiner*—J. Casimer Jacyna
(74) *Attorney, Agent, or Firm*—Notaro & Michalos P.C.

(57) ABSTRACT

The present invention relates to a direct flow tap for dispensing drinks, of the type with ball valve and actuated by a handle linked to said ball and provided with means suitable for limiting the rotation of said handle between two end positions, respectively corresponding to the closing and opening of said tap, characterized in that said means suitable for limiting the rotation of said handle is housed into the tap body.

Said means suitable for limiting the rotation of said handle comprises a pin (14) provided with a prismatic portion (17) which alternately abuts for opening and closing, against a pair of jig locators (19) and (20) obtained on a fixed portion of the tap body.

1 Claim, 4 Drawing Sheets

(a)

(b)

DIRECT FLOW TAP FOR DISPENSING DRINKS, PROVIDED WITH IMPROVED DEVICES FOR STOPPING THE OPERATING HANDLE

BACKGROUND OF THE INVENTION

The invention relates to a direct flow tap for dispensing drinks.

Known taps for this use are of the type wit h ball valve, and they are actuated by a handle linked to the sealing ball.

A chamber is obtained into the tap body, which communicates at the same time with a supply line, which connects the drink container to the tap, and with a spout from where the tapped drink is poured.

A seal is housed on the edge of the line carrying the drink to the tap on which a grooved ball is kept pressed so that, when the groove is totally out of said seal, it prevents the fluid flow.

By turning the ball, the groove is moved at the supply line and the fluid can flow out of said groove.

The ball rotation is controlled by the handle and must be of a fixed angle, based on the size of the ball, of the groove, and of the supply line diameter.

For this reason, stroke ends are provided on the tap, suitable for limiting the rotation of the handle between two fixed angular positions respectively corresponding to the full closing and full opening of the tap.

Said stroke ends are normally fitted on the tap body and act on the handle that abuts against them.

SUMMARY OF THE INVENTION

This solution of the prior art exhibits a certain number of disadvantages solved by this invention.

A first disadvantage consists in that said stroke ends are a constraint for the designer, since they are obtained outside the tap body. This is not negligible, since this type of tap is an important accessory in the furnishings of bars and pubs where it is typically used.

A second disadvantage is a consequence of the fact that contact between the handle and the stroke end occurs in a visible zone. Since both that tap and the handle are usually made of chromium plated brass, the repeated contacts cause wear of the coating layer, with consequent exposition of the underlying brass. In the most favourable cases, the disadvantage is limited to the darkening of the exposed brass, whereas in the most unfavourable cases there is the concrete risk of flaking of the galvanic coating, with highly negative effects on the aesthetic appearance.

A third disadvantage consists in that operating the handle in a hurry, as it often happens when the place is very crowded with customers, the hand's skin could get pinched between the handle and the stroke end. Even though this is not a serious accident, it is certainly annoying.

A fourth disadvantage consists in that the manufacture of said stroke end requires milling the tap body, with the subsequent increase in costs.

The invention solves the disadvantages mentioned above through a stroke end acting between the ball turning pin and the tap body.

In this way, the contact limiting the pin rotation can take place inside the tap body and does not affect the handle that is linked to said pin. This implies that, since it is not visible from the outside, all of the related problems are solved.

Moreover, it is much easier to manufacture, with the consequent reduction of the production costs as well.

A preferred embodiment of the invention is described hereinafter by way of a non-limiting example.

BRIEF DESCRIPTION OF THE DRAWINGS

The invention is described with reference to the attached figures, wherein.

DETAILED DESCRIPTION OF THE PREFERRED EMBODIMENT

Figure 1:
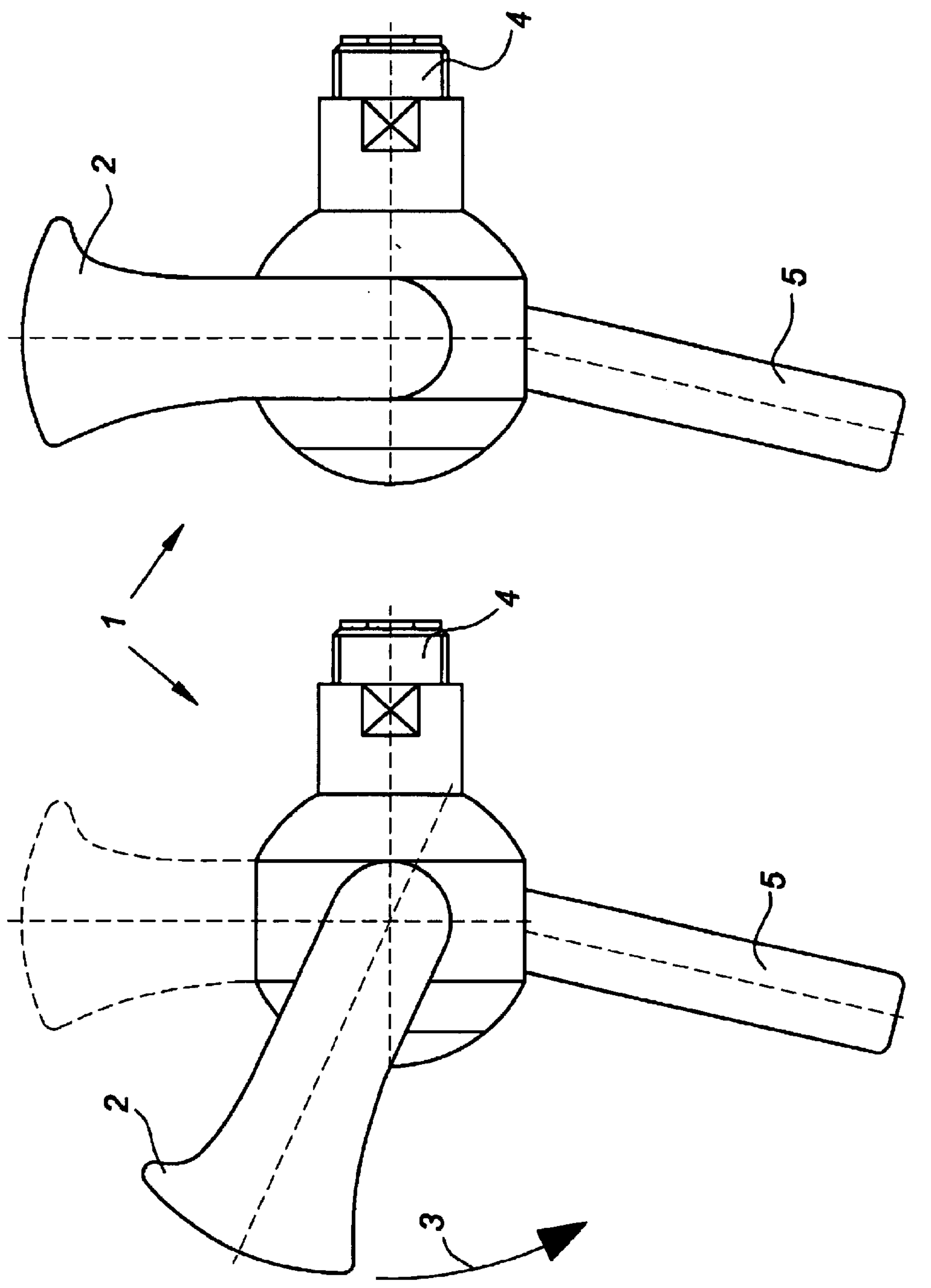
FIG. 1(*a, b*) shows the tap according to the invention, in open (a) and closed (b) position, FIG. 2(*a, b*) shows the inside members of the tap according to a section obtained with a vertical plane passing by the axes of the supply line and of the dispensing spout in open (a) and closed (b) position, FIG. 3(*a, b*) shows an enlarged section of the tap (a) obtained with a horizontal plane passing by the axis of the supply line and some inside elements (b), FIG. 4(*a, b*) shows the stroke end device according to the invention, in open (a) and closed (b) position.
Figure 2:
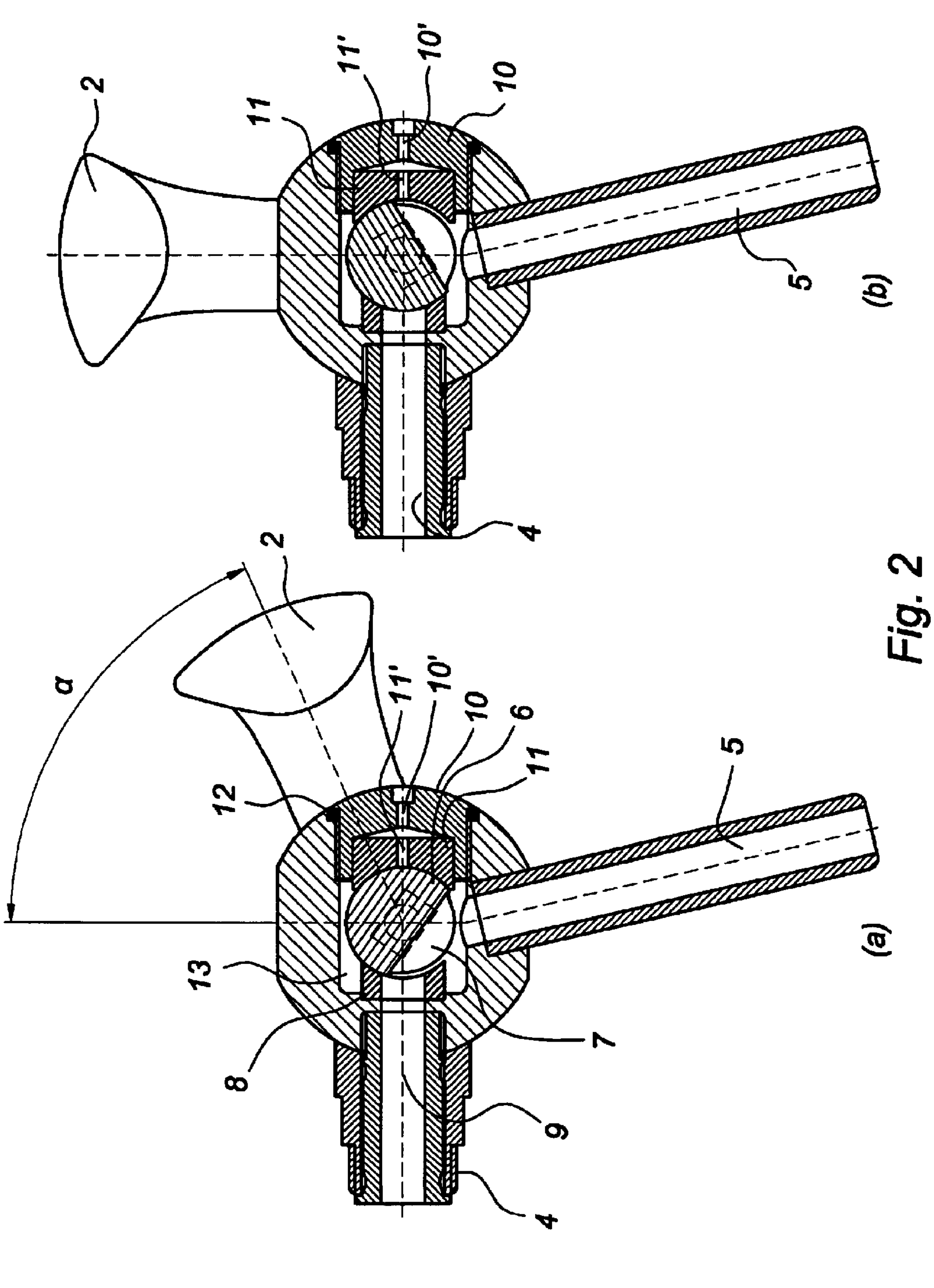

With reference to FIG. 1, number (1) indicates the tap according to the invention in open position (FIG. 1*a*) and in closed position (FIG. 1*b*), said opening being obtained by the rotation of a handle (2) in the direction indicated by the arrow (3) and said closing being obtained by the rotation of said handle (2) in the direction opposed to the arrow (3).

Said tap is installed on the supply line by a threaded tang (4) and the drink is poured from said tap by a spout (5).

The opening and closing of the drink flow is obtained using a ball (6) provided with a groove (7) contained in a chamber (13) which is held pressed against a first gasket (8) arranged at the end of a supply line (9).

Pressure is exerted by a screw cap (10) that pushes against said ball (6) through a second gasket (11).

A hole (10') is obtained onto said screw cap (10) whereas a hole (11') is obtained onto said gasket (11).

Said holes (10') and (11') place said chamber (13) in communication with the exterior.

A third packing ring (12) ensures the sealing between said screw cap (10) and the tap body, so that the fluid into said chamber (13) containing said ball (6) cannot leak from the threading of said screw cap (10).

When said groove (7) of said ball (6) is at said supply line (9), the drink flows out of said line and fills the chamber (13) and hence, it passes into the spout (5) from where it is poured out.

At the same time, the ball (6) keeps the hole (11') of the second seal (11) closed, so there are no further outlets for the fluid contained into the chamber (13).

By turning the handle (2) upwards by an angle of 50–60°, the full portion of the ball fully covers the opening of the supply line (9), thereby stopping the drink's flow.

At the same time the groove (7) of the ball (6) is at the hole (11') of the seal and therefore it allows the air into the chamber (13) through said holes (10') and (11') to allow easy draining of the chamber (13).

Figure 3:
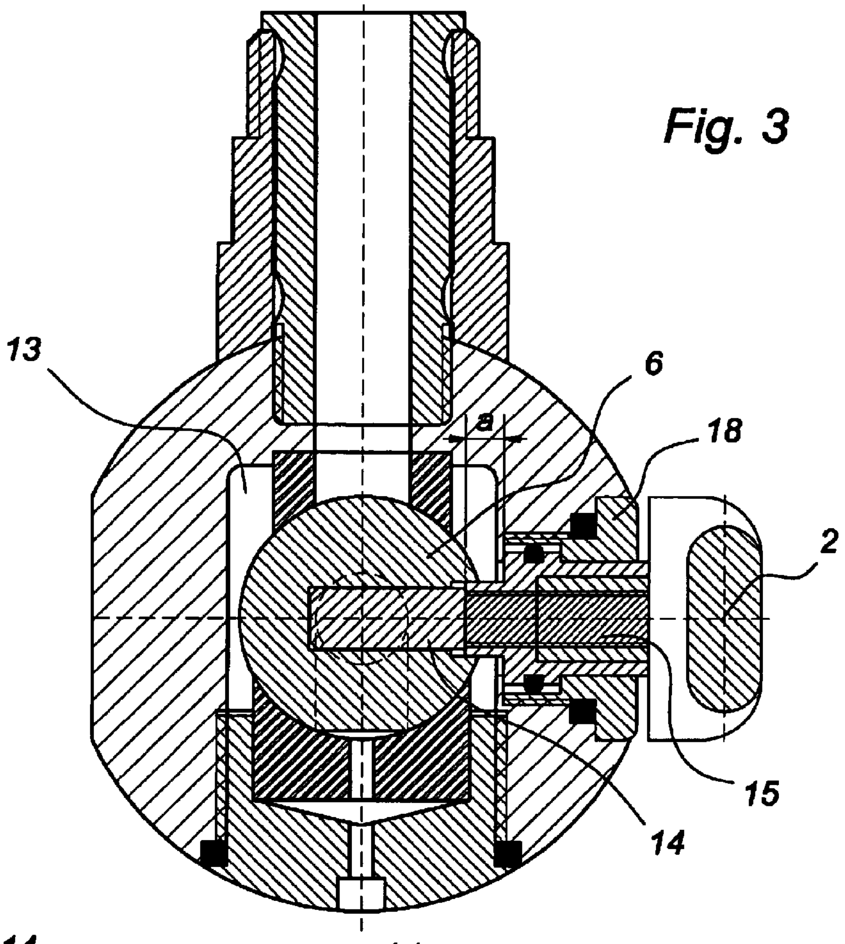
Figure 3:
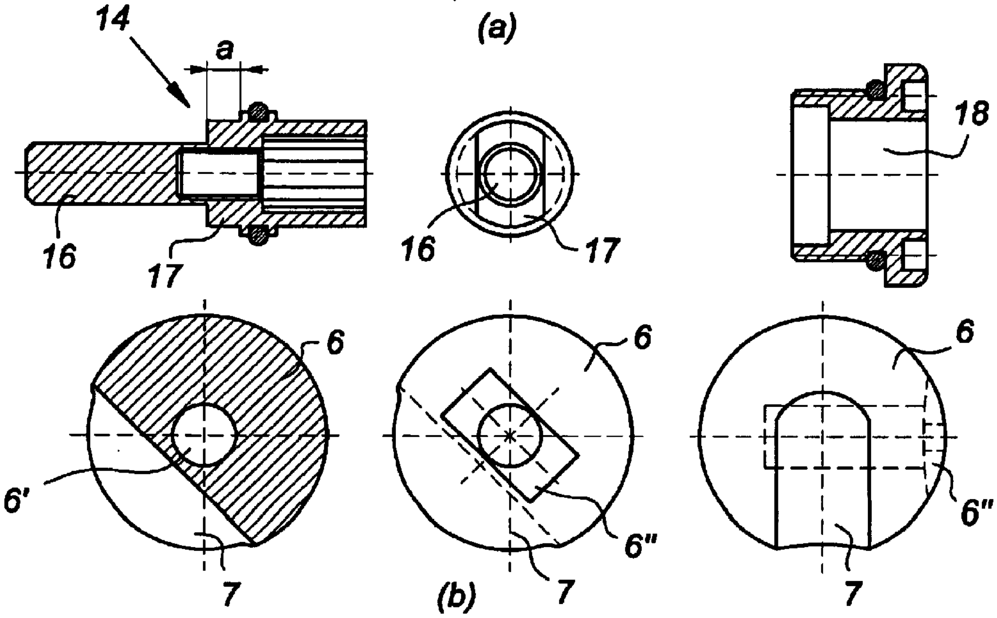

As shown in FIG. 3, said ball (6) is actuated by the handle (2) through a pin (14) made integral with said handle (2) by a screw (15).

Said pin (14) exhibits a cylindrical portion (16) that fits into a hole (6') of the ball (6) and a prismatic portion (17) that fits into a seat (6") of said ball (6).

Said pin (14) is installed on the tap body by an outside threaded bushing (18) that axially locks it, but lets it free to rotate.

Side sealing is ensured by packing rings on the pin (14) and on the bushing (18).

By turning the handle (2) it is possible to obtain the rotation of the ball (6) by effect of the engagement of the prismatic portion (17) of the pin (14) into the seat (6") of the ball (6).

Figure 4:
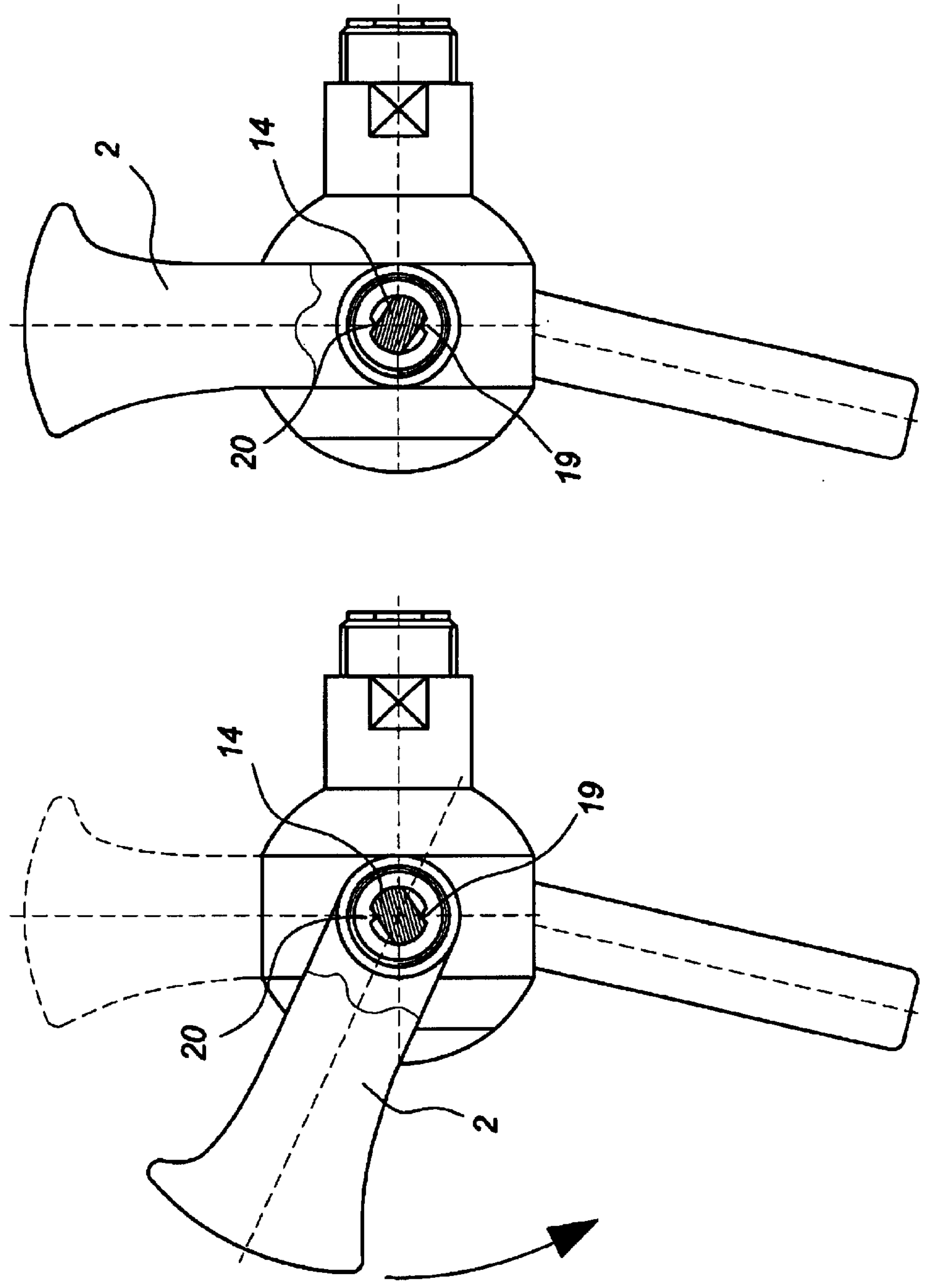

FIG. 4(*a*, b) show the stroke end device according to the invention in open (a) and closed (b) position.

As can be seen in FIG. 3*a*, the prismatic portion (17) of the pin (14), with length "a", engages the seat (6") of the ball (6) at one end, whereas with the other end it protrudes from the chamber (13) to partly penetrate into the tap body.

Said tap body, in the point where the prismatic portion (17) penetrates, exhibits two projections (19) and (20) (FIG. 4) against which said prismatic portion (17) abuts when actuated, in the two directions, by the handle (2).

Said two projections (19 and 20) are therefore suitable for acting as stroke ends for the rotation of the pin (14) and therefore, of the handle (2) and of the ball (6) integral with it.

As it clearly appears from the above description, the stroke end device is contained into the tap body, with evident aesthetic, wear-resistance and handiness advantages, since the hand's skin cannot be pinched between the handle and the tap body.

Finally, since the two projections (19) and (20) can be obtained by a simple broaching process, a considerable reduction of costs is achieved, compared to the milling required to manufacture the stroke ends according to the prior art.

What is claimed is:

1. Direct flow tap for dispensing drinks, of the type with ball valve and actuated by a handle linked to said ball and provided with means suitable for limiting the rotation of said handle between two end positions respectively corresponding to the closing and opening of said tap, characterised in that said means suitable for limiting the rotation of said handle is contained inside the tap body, said means suitable for limiting the rotation of said handle comprising a pin (14) provided with a prismatic portion (17) that alternately abuts, for opening and closing, against a pair of jig locators (19) and (20) obtained on a fixed portion of the tap body, said pin (14) having a cylindrical portion (16) that fits into a hole (6') of a ball (6) for closing and opening said tap, whereas said prismatic portion (17) fits into a seat (6") of said ball (6), said cylindrical portion guiding said ball and said prismatic portion causing the rotation of said ball.

* * * * *